Patented Jan. 29, 1946

2,393,930

UNITED STATES PATENT OFFICE 2,393,930

OMEGA-ALKOXYALKYL ETHERS OF DIPHENYLAMINES

Robert P. Parker, Somerville, and James M. Smith, Jr., North Plainfield, N. J., assignors to American Cyanamid Company, New York, N. Y., a corporation of Maine No Drawing. Application July 3, 1944, Serial No. 543,429

10 Claims. (Cl. 260—571)

This invention relates to new derivatives of diphenylamines which correspond to 4'-hydroxy-4-amino or 4-nitrodiphenylamines in which the hydrogen of the hydroxy group is replaced by an omega-alkoxyalkyl radical. The compounds of the present invention which contain primary amino groups and their salts are capable of diazotization and coupling with various coupling components, particularly ice-color coupling components to produce blue to violet pigments or dyes which exhibit superior fastness properties such as fastness to light, heat and washing. The shades are, also, for the most part bright. This fills a definite want as few amino compounds have been known which can be diazotized and coupled with ice-color coupling components to give strong blue to violet shades with satisfactory fastness properties.

The products of the present invention may be produced by two general methods, 4'-hydroxy-4-nitrodiphenylamine or its 2-sulfonic acid derivative may be reacted with omega-alkoxyalkyl halides or omega-alkoxyalkyl esters of organic or inorganic acids. This produces the omega-alkoxyalkyl derivatives directly. The nitro group is reduced and if desired the 2-sulfonic group, if present, may be removed by hydrolysis before or after reduction. A second method proceeds from the omega-hydroxyalkyl ethers of 4'-hydroxy-4-nitrodiphenylamine or their 2-sulfonic acid derivative which are reacted with an alkyl ester of an organic or inorganic acid. If an amino derivative is desired the nitro group is reduced by the conventional methods.

It is an advantage of the present invention that the amino derivative can be obtained by reducing the corresponding nitro compounds in either alkaline or acid medium. The pH determines whether the free bases or the salts are produced. The two are interchangeable and either may be used if the compound is to be diazotized.

The present invention is not limited to a particular omega-alkoxyalkyl derivative. Typical omega-alkoxyalkyl radicals are: omega-methoxymethyl, beta-methoxyethyl, beta-ethoxyethyl, beta-butoxyethyl, gamma-ethoxypropyl, beta-(beta-methoxy) ethoxyethyl and beta-(beta-ethoxy) ethoxyethyl.

The amino compound may be diazotized in the conventional manner, but as two different compounds may be formed the conditions are far from immaterial. Lower temperature and lower acid concentrations and controlled nitrite addition favors the formation of the diazonium compound itself, while higher temperatures and higher concentrations of the base and mineral acid and excess nitrous acid cause the formation of an N-nitroso derivative of the diazonium compounds.

The N-nitroso derivatives, in general, produce dyes of different and less desirable shades and they are also duller. The N-nitroso colors can be hydrolyzed to the more desirable colors by heating in dilute solutions with an alkali such as soda ash. The hydrolysis preferably takes place in the presence of a reducing agent such as sodium sulfide, sodium bisulfite and the like which destroy nitric oxides liberated. In their diazotized form, the bases may be coupled either with or without a substrate, to yield dyestuffs or pigments of great value because of their strength, variety of shade and fastness properties. In particular, however, the bases of the present invention are important for the production of fast blue prints or dyeings upon cellulosic materials. These are produced in general, by impregnating the cellulosic material in alkaline baths with appropriate ice-color coupling components and then printing solutions of the diazotized bases which have been buffered and thickened upon such prepared cloth, or by pad dyeing the prepared cloth in buffered solutions of the diazotized bases.

Solutions of the diazotized bases of the present invention may be also treated with inorganic alkali metal salts or alkali-earth metal salts, or with mixtures of these salts together with appropriate inorganic metal salts whereupon the diazonium salts or metal salt complexes of the diazonium salts are precipitated. These may be separated, dried, stored or blended with inorganic salts such for example as with sodium or potassium chlorides, sulfates, magnesium sulfate, aluminum sulfate and the like; the latter preferably being used in their partially dehydrated forms. Such products may be readily dissolved in water to yield solutions from which cellulosic materials which have previously been impregnated in alkaline grounding baths with appropriate ice-color coupling components may be suitably pad dyed, or the solutions may be appropriately thickened and printed upon the prepared cellulosic fabrics.

The bases of the present invention may also be converted into diazosulfonates which may be isolated from solution, dried, stored or they may be blended in the dry state with appropriate ice-color coupling components and oxidizing agents. Such blends may be incorporated into a printing paste, printed upon vegetable fibers and the pigment developed by treatment with steam.

The invention will be more fully illustrated in conjunction with the following examples which are meant to be illustrative only and not by way of limitations. All parts are by weight unless otherwise noted.

Example 1

4'-(beta-methoxyethoxy)-4-nitrodiphenylamine

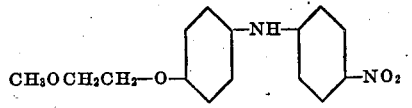

a mixture of 34.5 parts 4'-hydroxy-4-nitrodiphenylamine, 286 parts of water containing 7.2 parts sodium hydroxide, and 38.4 parts beta-methoxyethyl-p-toluenesulfonate is heated at 80°–85° C. in a water bath for three hours. The dark red oil which separated during this time is transformed to a deep red solid by stirring and chilling in an ice bath. This slurry is kept alkaline, and the solid is collected on a filter. The 4'-(beta-methoxyethoxy)-4-nitrodiphenylamine is washed on the filter with dilute caustic until the filtrate is no longer colored, and is then washed free of alkali with water. This product, after being recrystallized from dilute alcohol, is in the form of orange-red crystals, which melt at 82.5°–84.5° C.

Example 2

4'-(beta-methoxyethoxy)-4-aminodiphenylamine

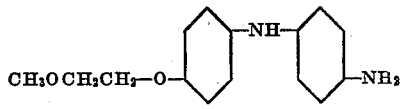

a solution of 88.2 parts of sodium sulfide chips (60% pure) in 300 parts of warm water is prepared and is clarified. The filtrate is run into a reaction vessel equipped with stirrer and 24 parts of ethyl alcohol added. The temperature of the solution is raised to 70°–75° C. while 32.5 parts 4'-(beta-methoxyethoxy)-4-nitrodiphenylamine is strewn in portionwise. When the nitro compound melts, the reaction mixture is heated at reflux temperature for five hours. An additional 55 parts of alcohol is then added, and the reaction mixture is cooled down and is allowed to stir at room temperature for 12 hours. Reduction is completed by heating at 85° C. for six hours. The resulting mixture is cooled in an ice bath and diluted with water until there is no further separation of the liquid product.

The oil layer is separated and is washed twice with water containing a little dissolved sodium hydrosulfite. Then the oil layer is run into 350 parts of water, and hydrochloric acid is added to an acidic test against Congo red paper. The solution is heated to 50° C. is treated with charcoal, and filtered. The filtrate is chilled in an ice bath and the crystalline 4'-(beta-methoxyethoxy)-4-aminodiphenylamine hydrochloride is precipitated by addition of sodium chloride. It is filtered off and is dried at low temperature.

Example 3

4'-(omega-methoxymethoxy)-4-nitrodiphenylamine

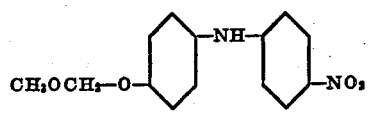

five parts of 89% potassium hydroxide are dissolved in 197 parts of absolute alcohol, and the temperature is lowered to 0° C. While stirring at this temperature, 15 parts of 4'-hydroxy-4-nitrodiphenylamine are stirred into solution and the temperature is then lowered to −10° C. While stirring at this temperature 5.8 parts of chloromethyl methyl ether are slowly dropped in, the temperature being maintained at −9° to −11° C. When addition is finished reaction is completed by allowing the temperature to rise slowly to room temperature and then by heating shortly at 50° C. The solution is clarified at this elevated temperature, and by chilling the product is caused to precipitate from the alcohol solution from which it is separated by filtration. When purified by crystallization from alcohol, the 4'-(omega-methoxy methoxy)-4-nitro diphenylamine melts at 121–122° C.

Example 4

4'-(omega-methoxymethoxy)-4-aminodiphenylamine

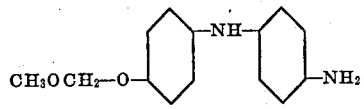

5.9 parts of 4'(omega-methoxy methoxy)-4-nitro diphenylamine are reduced in 45 parts of alcohol at 60° C. by stirring and slowly adding a solution of 13.3 parts of sodium sulfide in 59 parts of water. Reduction is complete in approximately five hours at which time the alcohol is removed by distillation under reduced pressure. On stirring and adding 200 parts of water to the residue, a tan solid is formed which may be separated by filtration. This product is purified by slurrying in 70 parts of water and adding hydrochloric acid to complete solution. After clarification, the sulfate salt of 4'-(omega-methoxy methoxy)-4-amino diphenylamine is precipitated by addition of sodium sulfate. The precipitated product is filtered off, washed with a little ice water and dried.

Example 5

4'-(beta-ethoxyethoxy)-4-aminodiphenylamine-2-sulfonic acid

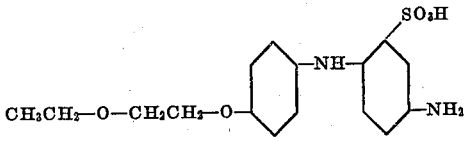

37.3 parts of p-aminophenyl beta-ethoxyethyl ether, 59.5 parts of sodium-2-chloro-5-nitrobenzene sulfonate, 30 parts of calcium carbonate and 400 parts of water are heated with stirring at reflux temperature for 24 hours. 2,000 parts of water are run in and at reflux temperature 45 parts ammonium chloride are added and 50 parts of zinc dust are strewn in portionwise. When reduction is complete, as is indicated by decolorization, the solution is filtered, the filtrate is chilled and acetic acid is added to an acid reaction against blue litmus paper. The precipitated 4'-(beta-ethoxyethoxy)-4-aminodiphenylamine-2-sulfonic acid is filtered off and dried.

Example 6

4'-(beta-ethoxyethoxy)-4-aminodiphenylamine

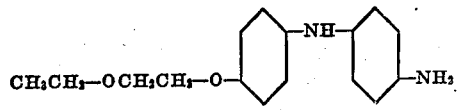

32 parts of 4'-(beta-ethoxyethoxy)-4-aminodiphenylamine-2-sulfonic acid are refluxed with 660.0 parts of 20% hydrochloric acid until there is no more alkali soluble material present. On cooling and neutralizing with sodium hydroxide, a low melting solid separates which is extracted with ether. The ether extract is dried over anhydrous sodium sulfate and 4'-(beta-ethoxyethoxy)-4-aminodiphenylamine is precipitated as a phosphate salt by addition of syrupy phosphoric acid, is filtered off and dried at low temperature.

*Example 7*

A mixture of 59 parts 4'-(beta-methoxyethoxy)-4-aminodiphenylamine hydrochloride, 750 parts of water, and 240 parts 17% hydrochloric acid is stirred at 15° C. while a solution of 16.5 parts sodium nitrite in 240 parts of water is slowly added. The resulting solution is warmed to 40° C. in a water bath, treated with charcoal and filtered. The clear, orange filtrate is stirred and cooled in an ice bath. The diazonium chloride of 4'-(beta-methoxyethoxy)-4-aminodiphenylamine is precipitated in the form of fine, yellow crystals by addition of sodium chloride. This diazonium chloride is collected on a filter and dried at low temperature. It is readily soluble in water.

*Example 8*

27 parts of the dry diazonium chloride as obtained in Example 7 are intimately mixed with 12 parts of magnesium sulfate dihydrate and 6 parts of anhydrous sodium sulfate.

0.2 part of this mixture is stirred in 2.5 parts of methanol and a slurry of 1.5 parts of the anilide of 2-hydroxy-3-naphthoic acid in a mixture of 2.5 parts of methanol and 5 parts of pyridine is added. A dark blue paste immediately results. This is stirred and heated on a steam bath for ten minutes, is then diluted with 200 parts of water and is made alkaline to phenolphthalein paper by addition of 20% sodium hydroxide solution. The precipitated pigment is flocculated by digestion on a steam bath, is filtered off, washed with hot water, with dilute hydrochloric acid, with water and then dried.

A dark blue-black pigment results, insoluble in water, which has the following formula:

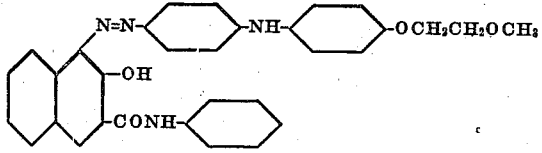

When, instead of the anilide of 2-hydroxy-3-naphthoic acid, an equivalent weight of beta naphthol is substituted, a dark blue black, water-insoluble pigment is produced which has the following formula:

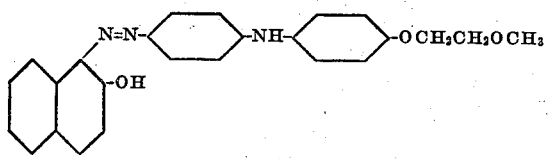

*Example 9*

7.7 parts of the sulfate salt of 4'-(beta-methoxyethoxy)-4-amino-diphenylamine are suspended in 45 parts of ethanol and 5.5 parts of 20% sodium hydroxide are added. The resulting solution is poured at 50° C. into a stirred solution of 65 parts zinc chloride and 1.75 parts of sodium nitrite in 65 parts of water. After stirring for ½ hour, the mixture is diluted with 500 parts of water, the temperature is raised to 80° C. and the solution is clarified. The temperature of the filtrate is lowered to 30° C. and 140 parts of salt are added. The bulky, orange precipitate of the zinc chloride double salt of the diazonium chloride of 4'-(beta-methoxy-ethoxy)-4-aminodiphenylamine is collected on a filter and is dried at low temperature. It is readily soluble in water.

The zinc chloride double salt thus produced may be incorporated into a carbohydrate printing paste with a small amount of sodium acetate as a buffer and printed on cotton cloth which has been padded with a solution of an ice-color coupling component such as an arylide of 2-hydroxy-3-naphthoic acid. A strong blue print is obtained having a slightly reddish shade.

*Example 10*

7.4 parts of the phosphate salt as obtained in Example 6 are dissolved in 30 parts of water and 20% sodium hydroxide is added to precipitate the free base which is extracted with ether. After evaporation of the ether, the residue is taken up in 20 parts of alcohol and this solution is run into a stirred solution of 65 parts fused zinc chloride and 1.5 parts sodium nitrite in 65 parts of water. After stirring for ½ hour, the mixture is filtered and the residue is washed with warm water. The alcohol is removed by reduced pressure distillation and the residual aqueous solution is treated with salt to precipitate the zinc chloride double salt of the diazonium chloride of 4'-(beta-ethoxyethoxy)-4-amino-diphenylamine as a bulky orange solid. This is collected on the filter.

The residual filter cake is dried by blending with 2 parts of magnesium sulfate dihydrate. The dried product is readily soluble in water.

*Example 11*

1 part of the dried zinc chloride double salt as obtained in Example 10 is dissolved in 200 parts of water and 2 parts of 20% sodium acetate solution are added. 5 parts of cotton fabric previously impregnated from an alkaline grounding liquor of the anilide of 2-hydroxy-3-naphthoic acid are continually stirred in the above buffered solution until color development is complete. The dyed fabric is rinsed, is heated at 70° C. in a clearing bath (3% soda ash and 2% sodium hydroxide), is treated at 60° C. in a ½% soap solution, is rinsed and dried. The cloth is strongly dyed a deep blue.

*Example 12*

4.0 parts of the sulfate salt of 4'-(omega-methoxy methoxy)-4-amino diphenylamine slurried in a mixture of 10 parts of water and 6 parts of 17% hydrochloric acid are treated at 15° C. with a 5% sodium nitrite solution until excess nitrite is present as is indicated by spotting against a starch-iodide paste. The resulting brown solution is clarified and the filtrate is stirred in an ice bath and is treated with salt. The diazonium chloride of 4'-(omega-methoxy methoxy)-4-amino diphenylamine separates as an oil which becomes friable on stirring. It is filtered off and is dried at low temperature.

This diazonium chloride is readily soluble in water and directly dyes cotton cloth, that has been previously impregnated with the anilide of 2-hydroxy-3-naphthoic acid in alkaline solution, a strong, bright blue.

We claim:
1. A new chemical compound having the formula:

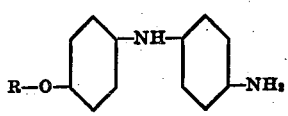

in which R is omega-alkoxyalkyl.

2. A new chemical compound having the formula:

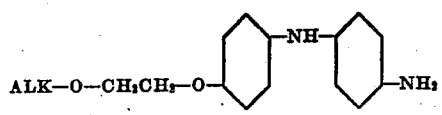

in which ALK is an alkyl.

3. 4'-(beta-methoxyethoxy)-4-aminodiphenylamine having the formula:

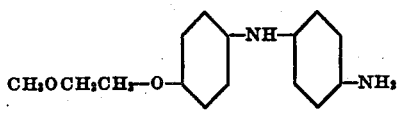

4. 4'-(beta-ethoxyethoxy)-4-aminodiphenylamine having the formula:

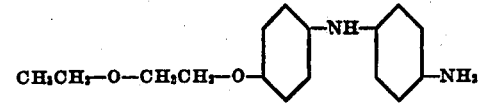

5. 4'-(omega-methoxy-methoxy)-4-aminodiphenylamine having the formula:

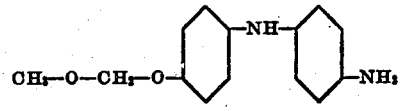

6. An addition salt of a compound of claim 1.
7. An addition salt of a compound of claim 2.
8. An addition salt of the compound of claim 3.
9. An addition salt of the compound of claim 4.
10. An addition salt of the compound of claim 5.

ROBERT P. PARKER.
JAMES M. SMITH, Jr.